Patented Feb. 5, 1946

2,393,972

UNITED STATES PATENT OFFICE 2,393,972

POLYAMIDES AND PROCESS FOR OBTAINING THEM

Theodore Le Sueur Cairns, Wilmington, Del., assignor to E. I. du Pont de Nemours & Company, Wilmington, Del., a corporation of Delaware No Drawing. Application June 3, 1942, Serial No. 445,636

6 Claims. (Cl. 18—54)

This invention relates to new chemical derivatives of synthetic linear polyamides and particularly to reaction products of polyamides and aldehydes.

The polyamides with which this invention is concerned are of the general type described in United States Patents 2,071,250, 2,071,253 and 2,130,948. The polyamides of this kind, also referred to as nylons, comprise the reaction product of a linear polymer-forming composition containing amide-forming groups, for example, one consisting essentially of bifunctional molecules each containing two reactive groups which are complementary to reactive groups in other molecules and which comprise complementary amide-forming groups. These polyamides as described above, or as otherwise identified hereinafter, can be obtained, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides are those having a unit length of at least seven where "unit length" is defined as in United States Patents 2,071,253 and 2,130,948.

These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. Both the simple and modified linear polyamides contain the recurring amide group

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, the diamine-dibasic acid polymers yield the diamine hydrochloride and the dibasic carboxylic acid, and the amino alcohol-dibasic acid polymers yield the amino alcohol hydrochloride and the dibasic carboxylic acid.

Many of the synthetic linear polyamides, such as polyhexamethylene adipamide, are of particular interest and value because of a combination of properties which comprise great strength and inertness toward most chemical reagents. These polymers are soluble in formic acid and in phenols but it is very difficult to prepare transparent, tough films from the solutions by conventional methods, such as dry or wet-casting. In addition most of the known polyamides are fusible, generally at temperatures below 275° C. For many purposes it would be advantageous if these polyamides could be converted to a form which, in solution, could be readily cast into fibers of films of good properties without any critical control of concentration or temperature. In addition new uses for the polyamides would be opened up if they could be applied or formed from solution and then converted to an infusible, insoluble form.

This invention has as an object the preparation of new and useful polymeric materials. A further object is a method for preparing substantially insoluble and infusible shaped articles from synthetic linear polyamides. Still another object is to prepare strong transparent films from solutions of synthetic linear polyamides. Other objects will appear hereinafter.

The above objects are accomplished by reacting with formaldehyde a solution, in an oxygen-containing acid, of a synthetic linear polyamide containing hydrogen-bearing amide nitrogen atoms and, prior to gelation of the reaction solution, forming the solution, with removal of solvent, into an article of the desired shape. During the formation of the shaped article, and particularly during the removal of last portions of the solvent, the polyamide becomes substantially insoluble.

The reactants consist essentially of those named. An acid other than the oxygen-containing acid should not be present in appreciable quantity. For instance if hydrochloric acid is present substantial polymer degradation occurs with the formation of an inferior product. Alcohols, phenols and related compounds, such as mercaptans, amines and amides, which react with formaldehyde should not be present in substantial amount since they alter the course of the reaction.

The mechanism of the reactions involved in the formation of the shaped articles of this invention is believed to be somewhat as follows. The formaldehyde reacts with the polyamide replacing the hydrogen on some of the amide groups by a methylol group as indicated below:

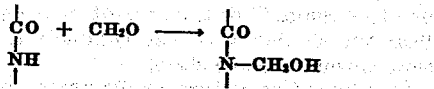

The number of amide groups in the polymer which are converted into N-methylol amide groups depends upon reaction conditions. When the solution containing the N-methylol polyamide is formed into a shaped article, the N-methylol polyamide is converted, with loss of water, into a substantially insoluble and infusible form of polymer which is apparently formed by cross-linking of polymer molecules through methylene bridges between amide nitrogens of adjacent polymer chains. The probable course of the reaction is represented by the equation:

The first step of the invention, namely, the modification of the polyamide in solution, can be carried out conveniently by adding a solution of formaldehyde to a solution of the polyamide in the oxygen-containing acid and maintaining the mixture at constant temperature in a reactor equipped with a stirring device. The formaldehyde is best dissolved in water or an acid such as is used for the polyamide solvent. The reaction is effected at moderate temperatures, usually between 20° and 80° C. although higher temperatures and temperatures below room temperature can be used depending on the particular conditions referred to hereinafter.

In carrying out the process of this invention it is desirable to select quantities and conditions so that a range of 5 to 150 minutes is optimum for the reaction in solution. The optimum time varies widely depending upon the temperature, composition of the reaction mixture, and the degree of reaction desired. The proper time for converting the solution into a shaped article is best determined by experimentation with a test sample. Once the time for gelation has been established for a given set of conditions, it is a simple matter to carry out the shaping step prior to gelation. Generally speaking, gelation is preceded by a rise in viscosity of the reaction mixture and the shaping step is not carried out until some increase in viscosity occurs. Of course if additional solvent is added during the course of the reaction this may obscure the viscosity change. The present process, as shown by the accompanying examples, is readily carried out with solutions of polyamide in formic acid which contain as low as 8% polyamide. The best method for carrying out the invention consists in reacting aqueous formaldehyde at room temperature with an approximately 25% solution of polyamide in formic acid and forming the shaped article after about two hours. Under these conditions the gel period would be reached in about three hours. It is preferable to continue the reaction in solution until at least 3% of the hydrogen-bearing amide groups have been converted into N-methylol amide groups.

The second step of invention is the formation of the desired shaped article from the ungelled solution. This can be accomplished in several ways. The solution can be poured onto a dry support and the solvent and excess reagent removed by evaporation, or the solution can be passed into a coagulating bath which is a non-solvent for the N-methylol polyamide but a solvent for the oxygen-containing acid, e. g., an aqueous solution of suitable inorganic or organic salts such that the solvent is removed. During or after removal of the solvent, it is desirable to heat the shaped article to complete the conversion to the insoluble state.

The invention is further illustrated by the following examples in which the parts, unless otherwise specified, are by weight.

*Example I*

A solution was prepared at room temperature from 90 parts formic acid (sp. gr. 1.20) and 25 parts of an interpolyamide prepared from adipic acid, sebacic acid, and hexamethylenediamine (molar ratio 3:7:10). To this was added 20 parts of commercial formaldehyde solution (37% formaldehyde by weight) dissolved in 54 parts formic acid. The mixture, a clear viscous solution, slowly increased in viscosity. Films of this solution were cast onto a glass support after 1.5 to 2.5 hours while the solution was still in the ungelled condition. After drying at 100° C. for one hour, the films were insoluble in m-cresol and did not melt at temperatures below 360° C. Films of 0.0036" thickness were transparent, had a tensile strength of 7,000 lbs./sq. in., and elongation at break of 262%, and an irreversible elongation (represents cold drawing) of 81%. In contrast the original interpolyamide was readily soluble in m-cresol and had a melting point of about 190° C.

*Example II*

To a solution of 10 parts polyhexamethylene adipamide in 110 parts formic acid (sp. gr. 1.20) maintained at room temperature was added 5 parts paraformaldehyde (containing 5% water by weight). After standing at room temperature for 24 hours, the mixture was warmed and the viscous solution was cast into a transparent film of 0.0034" thickness. On heating the film at 75° C. for 12 hours, it was essentially insoluble in hot cresol, had an elongation at break of 82%, and did not melt even at 320° C. The original polyhexamethylene adipamide was readily soluble in hot cresol, had an elongation at break of 420%, and a melting point of 264° C. Furthermore, films cast from a formic acid solution of comparable solids content of unmodified polyhexamethylene adipamide were cloudy and cheesy.

*Example III*

To a solution of 25 parts polyhexamethylene adipamide in 98 parts formic acid (sp. gr. 1.20) was added 0.5 part paraformaldehyde. After standing at room temperature for about 18 hours the solution was warmed and spun into fibers by the dry spinning method, using a temperature in the drying cell of about 200° C. The fibers were lustrous and elastic and did not melt at temperatures up to 325° C.

*Example IV*

To a solution of 10 parts polyhexamethylene adipamide in 60 parts formic acid (sp. gr. 1.20) heated to 100° C. was added during the course of ten minutes 0.2 part paraformaldehyde. After a total of 15 minutes heating the solution was cooled to room temperature and cast onto a glass support and the resultant film dried at 85° C. This film, which was transparent, did not melt at temperatures up to 315° C. When dyed with a 2% solution of a blue dye having a Colour Index No. of 518, the film absorbed very much more dye than a corresponding film of polyhexamethylene adipamide.

*Example V*

To a solution of 15 parts of an interpolymer derived from hexamethylenediammonium adipate, hexamethylenediammonium sebacate, and caprolactam (40:30:30 parts by weight respectively) in 108 parts formic acid was added 7 parts paraformaldehyde. After heating on a steam bath for about 30 minutes the solution was cooled to room temperature. A film cast from this solution by evaporating the solvent at 90° C. was very clear and rubbery. It had a pliability of 336, did not crack on bending until cooled to −58° F. and did not melt at 300° C., whereas a film of the unmodified interpolymer had a pliability of only 18, cracked on bending at −24° F., and melted at about 143° C.

The dibasic carboxylic acids, diamines, monoaminomonocarboxylic acids, and monoaminomonohydric alcohols from which the polyamides treated by the present process are obtained include, in addition to the usual type of reactants, those in which the carbon chain separating the functional groups is interrupted by one or more heterogeneous atoms such as oxygen, sulfur, or a tertiary nitrogen atom. Examples of reactants which can be used in preparing the polyamides are dibasic carboxylic acids, such as glutaric, adipic, pimelic, suberic, azelaic, sebacic, carbonic, 1,2-cyclohexanediacetic, para-phenylenediacetic, and diglycolic acids; diamines, such as ethylenediamine, tetramethylenediamine, pentamethylenediamine, hexamethylenediamine, octamethylenediamine, decamethylenediamine, meta-phenylenediamine, p-xylylenediamine, beta, beta'-diaminodiethyl sulfide, and triglycoldiamine; primary monoaminomonocarboxylic acids, such as 6-aminocaproic, 7-aminoheptoic, 12-aminostearic, and 4-aminocyclohexylcarboxylic acids; and primary monoaminomonohydric alcohols, such as ethanolamine and 4-aminobutyl alcohol.

The interpolyamides provide a large number of polymers advantageously used in the practice of this invention. Polyamides of this kind are obtained from a mixture of polyamide-forming compositions, e. g., from a mixture of two diprimary diamines with one or more dibasic carboxylic acids or from a mixture of a diprimary diamine and a dibasic carboxylic acid with a polymerizable monoaminomonocarboxylic acid. The polyamides, as previously indicated, include also polymers obtained by reacting a polyamide-forming composition with another polymer-forming composition, e. g., a polyester-forming composition. Polyamides initially soluble in aqueous organic solvents can also be treated by the present process. Polyamides which do not contain a hydrogen-bearing amide nitrogen atom are excluded. However, polyamides which contain both non-hydrogen bearing amide groups and hydrogen-bearing amide groups, e. g., a polyamide derived from a dibasic carboxylic acid, a diprimary diamine and a disecondary diamine, can be used.

The solvent for the polymer, which may also serve as a catalyst, can be any oxygen-containing acid free from formaldehyde-reactive groups, but formic and acetic acids are especially desirable by reason of their good solvent action and low boiling point. Other solvents include propionic acid, butyric acid, phosphoric acid, mono-, di- and trichloroacetic acids, and other acids included in this classification. Mixtures of these acids and mixtures of these acids with anhydrides, such as acetic anhydride, can also be employed.

Substances other than the reactants, such as materials acting as diluents and partial solvents, namely, water, esters, hydrocarbons, and chlorinated hydrocarbons can be present without altering the reaction or products. In particular there may be mentioned methyl and ethyl formates, methyl and ethyl acetates, benzene, toluene, and chloroform. These substances can not only be present in the solvent, but can also be added during the course of the reaction. It has been found that the addition of water or other of these inert solvents to the reaction mixture retards gelation so that it is possible to extend the time of reaction and thus obtain a more highly modified product. The amount of solvent can vary over a wide range depending upon the conditions. In general it may be said that the quantity of solvent required is that necessary to form a homogeneous mixture at the temperature and pressure at which the reaction is to be carried out.

Formaldehyde in any form can be used in this invention. It can be used as solid paraformaldehyde or dissolved or suspended in water, in acids such as serve as solvent for the polyamides, or in an unreactive or inert solvent such as ethyl acetate or benzene. Certain impurities may be present in commercial formaldehyde, such as alcohols, which may modify the product in some measure. The small amount of alcohol present as an impurity in some grades of formaldehyde does not, however, restrict the formation of the dominating N-methylol derivative and its subsequent conversion into an insoluble product. The mention of formaldehyde herein also refers to formaldehyde-releasing compounds such as trioxane, hexamethylenetetramine, formals in general, and various polyoxymethylenes. The amount of formaldehyde used can be varied within wide limits. As little as 1% formaldehyde based on the amount of polyamide produces enough substitution to effect the properties of the polyamide. In fact a definite change in the properties of a polyamide is obtained by converting as little as 0.5% of the hydrogen-bearing amide groups into N-methylol amide groups. However, it is preferred to use 5 to 30% of formaldehyde based on the weight of polyamide. Increasing the amount of formaldehyde beyond 30% increases only slightly the degree of substitution.

The manner in which formaldehyde is added decides to a large extent the conditions most favorable for the reaction. If the aldehyde is added in a water solution it is preferred to use a temperature range from 50° to 100° C. in order to prevent polymer precipitation during the addition. As more concentrated formaldehyde solution is used the temperature can be as low as 0° C. Addition of formaldehyde in an acid solution permits a wider range in temperature, namely, from 0° C. to 150° C., but renders more crucial the time of reaction. Under comparable conditions decreasing the amount of water present shortens the time before gelation takes place. When little or no water is present the reaction is very rapid so that appreciable reaction occurs within one minute. The total water content can vary from about 0 to 50%. In general the trends are as follows: As the water content increases the time and temperature variables can be increased; as the temperature increases the time should be decreased and/or the water content increased; as the time increases the water content should be increased and/or the temperature decreased.

In the second step of the process, namely, the preparation of the shaped article, the reaction mixture is directly cast as a film onto a glass, porcelain, metal, or other support either at room temperature or at temperatures as high as the boiling point of the solvent, and the solvent is allowed to evaporate either at room temperature or in an oven at temperatures up to 200° C. In the case of certain supports, e. g., glass having an oily surface, the film can be stripped from the support if an unsupported film is desired. It is also possible to extrude the reaction mixture in the form of a filament, bristle, yarn or sheet from a suitable nozzle into an evaporative zone which removes the solvent. Further, it is possible to form shaped articles from the reaction mixture by extrusion or immersion in an aqueous salt bath which coagulates the modified polyamide in the desired form.

Other uses for the solutions are as coating compositions for metal, wood, paper, cloth, and other fabrics. Since the coatings obtained, particularly on baking, are solvent-resistant and essentially infusible, the solutions are particularly valuable as coatings for fabrics to be used as leather substitutes, e. g., as uppers for footwear. Films and coated fabrics prepared from the solutions are extremely resistant to gasoline/benzene mixtures and as a result are useful in the construction of self-sealing fuel cells. The solutions can also be used as impregnating agents and adhesives. For example, the solutions are useful as adhesives for wood, regenerated cellulose, and paper. Another use for the solutions is in applying an electrical insulating coating to conductors, such as wires and cables.

In the preparation of coatings, films, and other shaped articles according to the process of this invention, the solutions can be admixed with pigments, e. g., titanium dioxide and carbon black; dyes; cellulose derivatives; resins, e. g., phenol-formaldehyde resins and sulfonamide-formaldehyde resins; plasticizers, e. g., methyl 10-phenylolstearate, 1,12-di(hydroxyphenyl) octadecane, and amylbenzenesulfonamide; and other modifying agents.

As many apparently widely different embodiments of this invention may be made without departing from the spirit and scope thereof, it is to be understood that I do not limit myself to the specific embodiments thereof except as defined in the appended claims.

I claim:

1. A process for preparing from polyamide an insolubilized infusible shaped article, said process comprising reacting a mixture of reactants yielding a liquid reaction product which gels on standing and consisting essentially of formaldehyde and a homogeneous solution, in an oxygen-containing organic acid, of a linear polyamide which is present in amount of at least 8% of said solution and which contains hydrogen-bearing amide nitrogen atoms, continuing the reaction until a substantial amount of the hydrogen-bearing amide groups have reacted with formaldehyde, and after some increase in viscosity has taken place but while the reaction mixture is still freely fluid, forming the solution resulting from the reaction into the shape required for said article, and then removing the solvent therefrom and heating the shaped article until it is infusible and essentially insoluble in organic liquid, in which said polyamide was initially soluble, said first mentioned polyamide being the reaction product of a linear polymer-forming composition comprising reacting material selected from the group consisting of (a) monoamino-monocarboxylic acids, (b) mixtures of diamine with dibasic carboxylic acid, and (c) mixtures of monoaminomonohydric alcohol with dibasic carboxylic acid.

2. A process for preparing from polyamide insolubilized and infusible filaments said process comprising reacting a mixture of reactants yielding a liquid reaction product which gels on standing and consisting essentially of formaldehyde and a homogeneous solution, in an oxygen-containing organic acid, of a linear polyamide which is present in amount of at least 8% of said solution and which contains hydrogen-bearing amide nitrogen atoms, continuing the reaction until a substantial amount of the hydrogen-bearing amide groups have reacted with formaldehyde, and after some increase in viscosity has taken place but while the reaction mixture is still freely fluid, extruding the solution resulting from the reaction in the shape of a filament into a coagulating bath, and then heating the shaped filament until it is infusible and essentially insoluble in organic liquid in which said polyamide was initially soluble, said first mentioned polyamide being the reaction product of a linear polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

3. The process set forth in claim 1 in which said oxygen-containing acid is formic acid.

4. The process set forth in claim 2 in which said oxygen-containing acid is formic acid and said polyamide is polyhexamethylene adipamide.

5. The process set forth in claim 1 in which said linear polymer-forming composition comprises hexamethylene diamine and adipic acid.

6. The process set forth in claim 1 in which said linear polymer-forming composition comprises hexamethylene diamine and adipic acid, and in which said oxygen-containing acid is formic acid.

THEODORE LE SUEUR CAIRNS.